July 17, 1962 D. W. MOORE 3,044,192
ROOT CUTTING ATTACHMENT FOR BULLDOZERS
Filed May 12, 1961 2 Sheets-Sheet 1
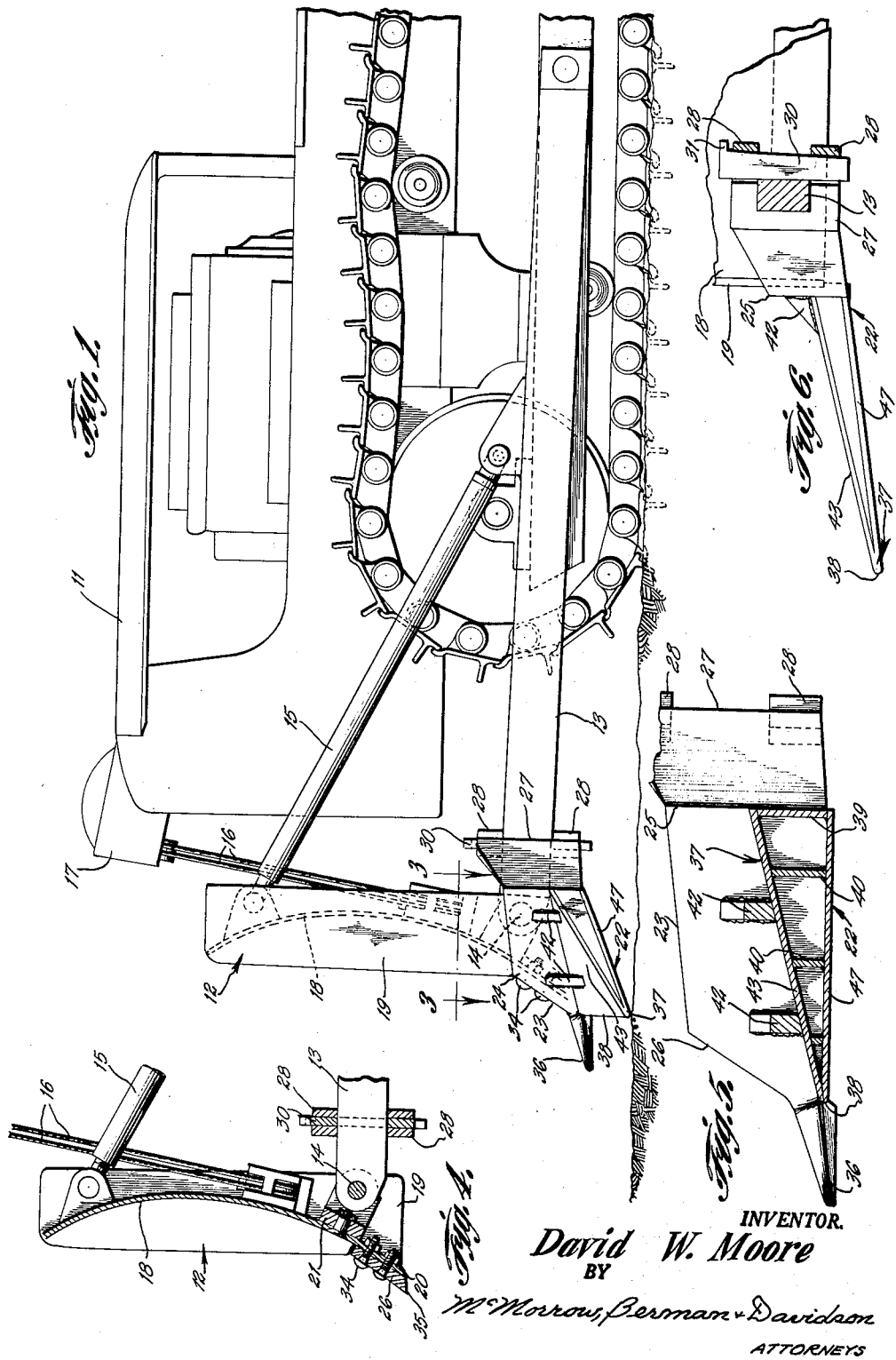
INVENTOR.
David W. Moore
BY
McMorrow, Berman & Davidson
ATTORNEYS

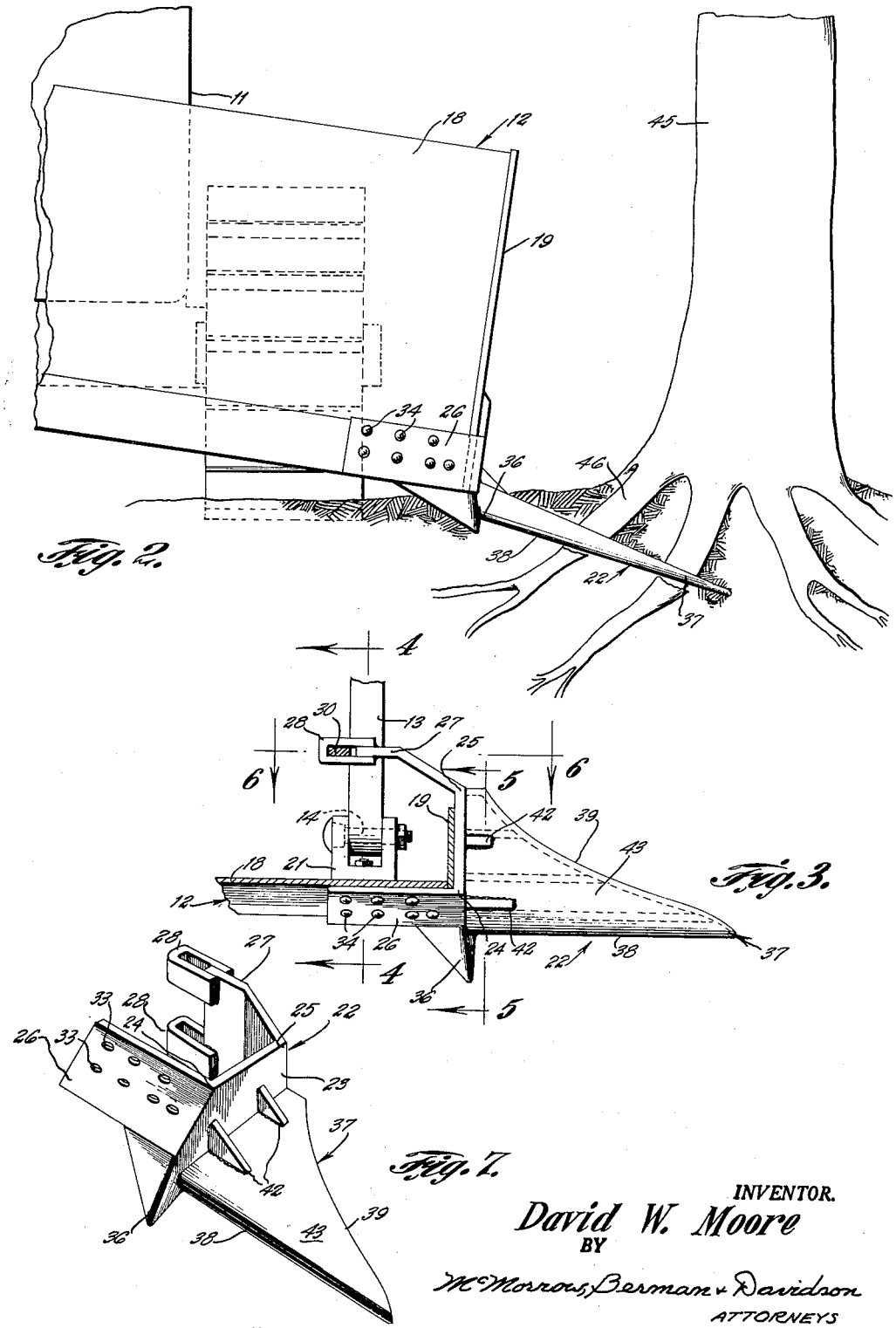

United States Patent Office 3,044,192
Patented July 17, 1962

3,044,192
ROOT CUTTING ATTACHMENT FOR BULLDOZERS
David W. Moore, Box 295, Hedrick, Iowa
Filed May 12, 1961, Ser. No. 109,654
4 Claims. (Cl. 37—2)

This invention relates to cutting attachments for bulldozers, and more particularly to a root cutting attachment for use with a bulldozer in cutting tree roots during land clearing operations.

The main object of the invention is to provide a novel and improved root cutting attachment for bulldozers, said attachment being simple in construction, being easy to install on a bulldozer, and extending laterally from the bulldozer blade when attached so that it can be easily employed in penetrating the soil adjacent a tree and in cutting the roots of the tree.

A further object of the invention is to provide an improved root cutting attachment for bulldozers, said attachment being relatively inexpensive to fabricate, being sturdy in construction, being relatively compact in size, and being adapted to be mounted on a conventional bulldozer by a person of ordinary skill employing ordinary hand tools.

Further objects and advantages of the invention will become apparent from the following description and claims, and from the accompanying drawings, wherein:

FIGURE 1 is a fragmentary side elevational view of the forward portion of a bulldozer equipped with an improved tree root cutting attachment according to the present invention.

FIGURE 2 is a fragmentary front elevational view of the bulldozer of FIGURE 1, showing the root cutting attachment and the portion of the bulldozer blade to which it is secured.

FIGURE 3 is a horizontal cross sectional view taken substantially on the line 3—3 of FIGURE 1.

FIGURE 4 is a vertical cross sectional view taken substantially on the line 4—4 of FIGURE 3.

FIGURE 5 is a transverse vertical cross sectional view taken substantially on the line 5—5 of FIGURE 3.

FIGURE 6 is a cross sectional view taken substantially on the line 6—6 of FIGURE 3.

FIGURE 7 is a perspective view showing the root cutting attachment employed and illustrated in FIGURES 1 to 6.

Referring to the drawings, 11 generally designates a bulldozer of conventional construction provided with the front blade assembly 12. The blade assembly 12 is supported on the longitudinal pivoted beams 13, being pivoted thereto at 14, for angular adjustment around a transverse horizontal axis and being connected at its upper portion to the intermediate portions of the beams 13 by fluid pressure cylinders 15 which may be operated to adjust the blade assembly 12 around the pivot members 14. Conventional means, not shown, are employed to support, tilt, and to raise and lower the beams 13, for example, the beams may be adjustably supported by cables 16 extending from suitable winch means 17 mounted on the front top portion of the tractor, as shown in FIGURE 1.

The blade assembly 12 comprises the arcuately curved transversely extending main body portion 18 provided at its side edges with the vertical plates 19 rigidly secured thereto. The arcuately curved main body member 18 is formed with the sharpened bottom cutting edge portion 20.

As shown in FIGURE 3, the pivot elements 14 comprise transverse bolts which extend through the arms of U-shaped brackets 21 secured to the lower portion of the rear surface of main body member 18, the U-shaped bracket member 21 receiving the ends of the beams 13 therebetween and being pivotally connected thereto by the transverse bolts 14.

Designated generally at 22 is a root cutting attachment constructed in accordance with the present invention. The root cutting attachment 22 comprises a vertically channeled main body portion 23 having a right angled front corner 24 and an obtuse-angled rear corner 25. The member 23 is provided with the downwardly and forwardly inclined front wall 26 adapted to engage on the lower portion of the main body 18 of the bulldozer blade with one side edge of the blade assembly received in the channeled member 23. The member 23 is provided with the rear vertical wall 27 on which is rigidly secured a pair of vertically spaced generally U-shaped rigid loop members 28, 28 spaced to receive the adjacent beam member 13 therebetween.

As shown in FIGURE 4, the loops 28, 28 are spaced so as to closely engage respectively on the top and bottom edges of the beams 13 and are of sufficient length to project inwardly past the beams. A fastening key member 30 is inserted through the vertically aligned loop members 28, 28, the key member 30 being wedgingly engageable with the beam 13, as shown in FIGURE 6, and being provided at its top end with a retaining lug 31 to limit its downward movement. As shown in FIGURE 6, the key member 30 is downwardly tapered and is of sufficient width so that it will exert a tight clamping force against the beam member 13 when driven downwardly through the loop members 28, 28.

The downwardly and forwardly inclined front wall 26 is formed with fastening apertures 33 and is secured to the lower portion of the main body 18 of the bulldozer blade assembly by a plurality of fastening bolts 34 engaged through the apertures 33 and with corresponding apertures provided in the lower portion of the blade body 18. As shown in FIGURE 4, the wall 26 is provided with the relatively sharp bottom edge 35.

The main body 23 of the root-cutting attachment is formed at its lower front corner with a forwardly tapering grubbing spur 36 which is of substantial length and which projects downwardly and forwardly from the corner of body 23. Rigidly secured to the vertical wall of body 23 is the downwardly and outwardly inclined plow member 37 which is of generally triangular cross section, as shown in FIGURE 5, and which is formed with the laterally projecting forward root cutting edge 38 of substantial length. As shown in FIGURE 7, the plow blade 37 is of generally triangular shape and is provided with the inwardly and rearwardly inclined rear wall 39, the blade 37 being interiorly braced by brace plates 40 welded therein and extending substantially parallel to the front cutting edge 38. The plow blade 37 is further braced with respect to the vertical wall of the body 23 by triangular brace blocks 42, 42 rigidly connecting the top wall 43 of the blade 37 to the vertical wall of the attachment main body 23.

As shown in FIGURE 3, the front corner of the blade assembly 12 is received in the right angled corner 24 of the root-cutting attachment and the attachment is rigidly secured to the side margin of the blade assembly by the fastening bolts 34 and the wedging key 30.

In using the attachment, the bulldozer blade assembly 12 is angled in the manner illustrated in FIGURE 2 so that the laterally projecting plow blade 37 may penetrate the soil adjacent a tree 45 to be removed in the manner illustrated in FIGURE 2, so that the plow blade 37 may be moved forwardly through the soil to cut the roots 46 of the tree. This operation is continued all around the tree, until the main roots thereof are severed, allowing the tree to be uprooted and detached from the soil.

As shown in FIGURE 2, the plow blade assembly 37 is of substantial length and is of sufficient length to cut the main roots of a tree of relatively large size when employed in the manner above described.

As shown in FIGURE 5, the plow blade 37 tapers forwardly at a relatively small acute angle between the top wall 43 and the bottom wall 47 of the plow blade.

As will be readily apparent, the cutting attachment above described may be employed to clear brush, trees or stumps by cutting the roots around and under the brush trees or stumps below ground level. This action severs the trees, stumps, or brush by cutting the main root structure, allowing the tree stumps, or brush to be taken away, leaving the ground free and ready for tillage, grading or other land work. The attachment is secured to a standard bulldozer blade in the same manner as end bits are secured to the blade, employing the same fastening openings in the blade body 18 as are employed for the securement of said end bits. Because the attachment extends outward from the side edge of the main blade assembly 12, it will project sufficiently beneath the ground surface toward the center of the tree or stump to be removed to cut most of the roots of all but the largest of trees or stumps. The size of the brush, tree or stump to be removed determines the number of passes necessary to accomplish the root cutting operation. A sufficient number of passes are made around the tree, stump or brush until the root structure has been severed sufficiently to allow the tree, stump or brush to be pushed over by the bulldozer blade assembly 12 in the standard manner.

The operation is made in a back-and-forth manner, namely, a pass under the tree in a forward direction and then back to the next position, until a sufficient number of passes have been made to free the brush, tree or stump in the manner above described.

The leading edge 38 of the blade member 37 is sharpened and suitably hardened to resist abrasion.

As above mentioned, in installing the attachment, it is first necessary to remove the conventional end bit from the bulldozer blade assembly and replace same with the attachment, employing the same fastening holes previously used to secure the end bit to the bulldozer blade assembly.

The bulldozer is prepared for the root cutting operation by tilting the blade assembly 12 to an angle in accordance with the size of the tree, brush or stump to be removed and in accordance with the nature of the soil to be penetrated.

While a specific embodiment of an improved root-cutting attachment for bulldozers has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a bulldozer provided with a laterally projecting blade having a substantially vertical side edge and a longitudinally extending supporting beam secured to said blade and extending rearwardly thereof, a root cutter comprising a vertically channeled main supporting body receiving and secured to said side edge of the bulldozer blade, means on the rear portion of said body receiving and clampingly engaging said bulldozer supporting beam, and a plow blade of substantial length projecting from said main supporting body and being inclined downwardly and laterally therefrom and being inclined downwardly and laterally from the bulldozer blade.

2. In combination, a bulldozer provided with a laterally projecting blade having a substantially vertical side edge and a longitudinally extending supporting beam secured to said blade and extending rearwardly thereof, a root cutter comprising a vertically channeled main supporting body receiving and secured to said side edge of the bulldozer blade, a pair of parallel vertically spaced horizontal loop members projecting from the rear edge of said body and receiving the supporting beam therebetween, a tapered wedge key engaged through said loop members and exerting clamping force on said beam, and a plow blade of substantial length projecting from said main supporting body and being inclined downwardly and laterally therefrom and being inclined downwardly and laterally from the bulldozer blade.

3. In combination, a bulldozer provided with a laterally projecting blade having a substantially vertical side edge and a longitudinally extending supporting beam secured to said blade and extending rearwardly thereof, a root cutter comprising a vertically channeled main supporting body receiving and secured to said side edge of the bulldozer blade, a pair of parallel vertically spaced horizontal loop members projecting from the rear edge of said body and receiving the supporting beam therebetween, a tapered wedge key engaged through said loop members and exerting clamping force on said beam, a plow blade of substantial length projecting from said main supporting body and being inclined downwardly and laterally therefrom and being inclined downwardly and laterally from the bulldozer blade, and a forwardly and downwardly directed pointed grubbing spur member secured to the forward corner of said main supporting body adjacent the leading edge of said plow blade.

4. In combination, a bulldozer provided with a laterally projecting blade having a substantially vertical side edge and a longitudinally extending supporting beam secured to said blade and extending rearwardly thereof, a root cutter comprising a vertically channeled main supporting body receiving and secured to said side edge of the bulldozer blade, said blade having a downwardly and forwardly inclined lower front portion, said body having a downwardly and forwardly inclined front wall conformably engaging on said lower front portion of the blade, a pair of parallel vertically spaced horizontal loop members projecting from the rear edge of said body and receiving the supporting beam therebetween, a tapered wedge key engaged through said loop members and exerting clamping force on said beam, a plow blade of substantial length projecting from said main supporting body and being inclined downwardly and laterally therefrom and being inclined downwardly and laterally from the bulldozer blade, and a forwardly and downwardly directed pointed grubbing spur member secured to the forward corner of said main supporting body adjacent the leading edge of said plow blade.

References Cited in the file of this patent

UNITED STATES PATENTS

| | | |
|---|---|---|
| 133,216 | Fletcher | Nov. 19, 1872 |
| 2,187,707 | Kane | Jan. 16, 1940 |
| 2,238,094 | Allin | Apr. 15, 1941 |
| 2,804,703 | Campbell | Sept. 3, 1957 |
| 2,882,622 | Howard | Apr. 21, 1959 |